United States Patent
Guzik et al.

(10) Patent No.: US 11,864,271 B2
(45) Date of Patent: Jan. 2, 2024

(54) MOBILE DEVICE ID TRACKING FOR AUTOMATIC INCIDENT DATA ASSOCIATION AND CORRELATION

(71) Applicants: Getac Technology Corporation, New Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 30 days.

(21) Appl. No.: 17/480,989

(22) Filed: Sep. 21, 2021

(65) Prior Publication Data

US 2023/0087554 A1 Mar. 23, 2023

(51) Int. Cl.
*H04W 8/24* (2009.01)
*H04W 8/08* (2009.01)
(Continued)

(52) U.S. Cl.
CPC ............. *H04W 8/24* (2013.01); *G08B 25/10* (2013.01); *H04N 7/185* (2013.01); *H04W 4/021* (2013.01); *H04W 4/029* (2018.02); *H04W 8/08* (2013.01)

(58) Field of Classification Search
CPC ......... H04W 12/80; H04W 4/90; H04W 8/24; H04W 8/08; H04W 4/021; H04W 4/029;
(Continued)

(56) References Cited

U.S. PATENT DOCUMENTS

| 3,530,451 A | 9/1970 | Devine |
| 5,108,019 A | 4/1992 | Woodward et al. |

(Continued)

FOREIGN PATENT DOCUMENTS

KR 102067905 B1 1/2020

OTHER PUBLICATIONS

Cloud Connected Guns for Cops that can Recognize Shots & Alert Backup in Realtime, Linus Tech Tips, Messageboard User Tech_Dreamer, Oct. 24, 2014. URL: <https://linustechtips.com/topic/238322-cloud-connected-guns-for-cops-that-can-recognize-shots-alert-backup-in-realtime/>.

(Continued)

*Primary Examiner* — Meless N Zewdu
(74) *Attorney, Agent, or Firm* — Han Santos, PLLC

(57) ABSTRACT

Multiple mobile device identifiers (IDs) of mobile devices and corresponding geolocations of the multiple of mobile device IDs are received from multiple mobile hubs during a time period. A selection of an incident that occurred at a particular geolocation at a particular date and time is then received. One or more mobile hubs of the multiple mobile hubs that were present within a selected geographical zone that includes the particular geolocation during a selected time frame that includes the particular date and time are identified based on at least one corresponding mobile device ID of the one or more mobile hubs. Sensor data obtained by at least one user device communicatively connected to the one or more mobile hubs of the multiple hubs are then associated with the incident.

20 Claims, 7 Drawing Sheets

(51) Int. Cl.
  *H04N 7/18* (2006.01)
  *H04W 4/029* (2018.01)
  *G08B 25/10* (2006.01)
  *H04W 4/021* (2018.01)

(58) Field of Classification Search
  CPC ......... H04W 4/02; H04W 4/50; H04W 76/50;
       H04W 4/38; H04W 4/60; H04W 4/08;
       H04W 4/70; H04W 84/18; H04W 84/20;
       H04W 88/00; H04W 88/02; H04W 88/08;
       H04W 12/30; H04W 12/33; H04W 12/50;
       H04W 12/55; H04W 12/60; H04W 12/61;
       H04W 12/63; H04W 12/64; H04W 12/69;
       H04W 24/00; H04W 24/02; H04W 24/04;
       H04W 4/30; H04W 8/02; H04W 8/00;
       G08B 25/10; G08B 25/00; H04N 7/18;
       H04N 7/185; H04L 63/30; H04L 63/302;
              H04L 63/304; H04L 67/535
  See application file for complete search history.

(56) References Cited

U.S. PATENT DOCUMENTS

| | | | |
|---|---|---|---|
| 5,479,149 | A | 12/1995 | Pike |
| 5,525,966 | A | 6/1996 | Parish |
| 5,828,301 | A | 10/1998 | Sanchez |
| 5,914,585 | A | 6/1999 | Grabon |
| 5,991,844 | A | 11/1999 | Khosrowpour |
| 6,563,424 | B1 | 5/2003 | Kaario |
| 7,409,557 | B2 | 8/2008 | Teppler |
| 7,843,329 | B2 | 11/2010 | Shigemori |
| 7,969,963 | B2 | 6/2011 | Duan et al. |
| 8,719,452 | B1 | 5/2014 | Ding et al. |
| 9,107,085 | B1* | 8/2015 | Wu ................ H04W 24/00 |
| 9,124,258 | B2 | 9/2015 | Pechaud et al. |
| 9,395,432 | B2 | 7/2016 | Boyd |
| 9,564,043 | B2 | 2/2017 | Sanders et al. |
| 9,742,221 | B2 | 8/2017 | Shinohara |
| 9,810,766 | B2 | 11/2017 | Boyd |
| 9,829,343 | B2 | 11/2017 | Sobotka et al. |
| 10,370,102 | B2 | 8/2019 | Boykin et al. |
| 10,403,124 | B1 | 9/2019 | Schuler et al. |
| 10,673,883 | B2 | 6/2020 | Wetterwald et al. |
| 11,378,355 | B1 | 7/2022 | Howard |
| 11,442,173 | B2 | 9/2022 | Kim et al. |
| 11,457,172 | B2 | 9/2022 | Takahashi et al. |
| 2003/0095032 | A1 | 5/2003 | Hoshino et al. |
| 2004/0167990 | A1 | 8/2004 | Peer |
| 2005/0066567 | A1 | 3/2005 | Newkirk et al. |
| 2005/0229654 | A1 | 10/2005 | Victor |
| 2006/0056560 | A1 | 3/2006 | Aweya et al. |
| 2006/0056563 | A1 | 3/2006 | Aweya et al. |
| 2007/0124979 | A1 | 6/2007 | Newkirk et al. |
| 2008/0204231 | A1 | 8/2008 | Hietanen et al. |
| 2009/0055229 | A1* | 2/2009 | Lidgren et al. ................ 705/7 |
| 2010/0172339 | A1 | 7/2010 | Duan et al. |
| 2010/0284683 | A1 | 11/2010 | Fressola et al. |
| 2011/0018998 | A1* | 1/2011 | Guzik ..................... 348/143 |
| 2012/0304634 | A1 | 12/2012 | Ooi et al. |
| 2013/0076398 | A1 | 3/2013 | Pechaud et al. |
| 2013/0138991 | A1 | 5/2013 | Reinke et al. |
| 2014/0129174 | A1 | 5/2014 | White et al. |
| 2015/0242608 | A1 | 8/2015 | Kim et al. |
| 2015/0254968 | A1 | 9/2015 | Sanders et al. |
| 2016/0086472 | A1 | 3/2016 | Herrera et al. |
| 2016/0100758 | A1 | 4/2016 | Jeong |
| 2016/0110975 | A1 | 4/2016 | Oppenheimer |
| 2016/0190859 | A1 | 6/2016 | Blum et al. |
| 2016/0228640 | A1* | 8/2016 | Pindado et al. ..... A61M 5/1723 |
| 2017/0003101 | A1 | 1/2017 | Madrid et al. |
| 2017/0010062 | A1 | 1/2017 | Black et al. |
| 2017/0059274 | A1 | 3/2017 | Crist et al. |
| 2017/0074617 | A1 | 3/2017 | Stewart et al. |
| 2017/0160050 | A1 | 6/2017 | Alfaro |
| 2017/0180536 | A1 | 6/2017 | Stock et al. |
| 2018/0050800 | A1 | 2/2018 | Boykin et al. |
| 2018/0069937 | A1* | 3/2018 | Kolleri ................... H04L 67/22 |
| 2018/0070840 | A1 | 3/2018 | Cronin et al. |
| 2018/0231349 | A1 | 8/2018 | Wagner et al. |
| 2019/0033043 | A1 | 1/2019 | Piccioni |
| 2019/0174208 | A1* | 6/2019 | Speicher et al. ......... H04Q 9/00 |
| 2019/0268526 | A1 | 8/2019 | Sosnovsky et al. |
| 2019/0373219 | A1* | 12/2019 | Sautner ................. H04N 7/181 |
| 2020/0003511 | A1 | 1/2020 | Deng et al. |
| 2020/0019682 | A1 | 1/2020 | Lee et al. |
| 2020/0027458 | A1 | 1/2020 | Torok et al. |
| 2020/0217613 | A1 | 7/2020 | Hatcher et al. |
| 2020/0267503 | A1* | 8/2020 | Watkins et al. ....... H04W 4/027 |
| 2020/0272826 | A1* | 8/2020 | Hasegawa et al. .......... G06K 9/00771 |
| 2020/0304638 | A1* | 9/2020 | Jensen ................. H04M 3/5116 |
| 2020/0314240 | A1* | 10/2020 | Leavitt et al. ....... H04M 3/5116 |
| 2020/0327347 | A1* | 10/2020 | Arai et al. ......... G06K 9/00892 |
| 2020/0355463 | A1* | 11/2020 | Piccioni ................ F41C 33/029 |
| 2020/0370863 | A1 | 11/2020 | Wagner et al. |
| 2021/0005850 | A1 | 1/2021 | Thiel et al. |
| 2021/0044673 | A1* | 2/2021 | MacGabann ......... H04L 67/322 |
| 2021/0080208 | A1 | 3/2021 | Wu et al. |
| 2021/0088297 | A1 | 3/2021 | Henry |
| 2021/0132177 | A1 | 5/2021 | Srinivas et al. |
| 2021/0203168 | A1 | 7/2021 | Sharma et al. |
| 2021/0263965 | A1* | 8/2021 | Li et al. .............. G06F 16/7844 |
| 2022/0101702 | A1 | 3/2022 | Olsen |
| 2022/0110504 | A1 | 4/2022 | Inglis |
| 2022/0295437 | A1 | 9/2022 | Maluf et al. |
| 2022/0318095 | A1 | 10/2022 | Gautam et al. |

OTHER PUBLICATIONS

Miners, Zach. Startup arms cops with Internet-connected 'smart' guns, PC World, Oct. 27, 2014. URL: <https://www.pcworld.com/article/2839581/startup-arms-cops-with-internetconnected-smart-guns.html>.

Szondy, David. Wireless Yardarm Sensor monitors firearm use in real time, New Atlas, Oct. 27, 2014. URL: <https://newatlas.com/yardarm-sensor-firearms/34409/>.

Yardarm. Mar. 2021. URL: <http://www.yardarmtech.com>.

International Patent Application No. PCT/US2022/031647, International Search Report and Written Opinion dated Sep. 28, 2022, 10 pages.

U.S. Appl. No. 17/331,563, Notice of Allowance dated Aug. 3, 2022, 37 pages.

U.S. Appl. No. 17/331,563, Notice of Allowance dated Nov. 25, 2022, 38 pages.

U.S. Appl. No. 17/336,954 Final Office Action dated Apr. 19, 2023, 34 pages.

U.S. Appl. No. 17/336,954 Office Action dated Nov. 21, 2022, 30 pages.

U.S. Appl. No. 17/354,835, Notice of Allowance dated Feb. 17, 2023, 18 pages.

U.S. Appl. No. 17/354,835, Office Action dated Oct. 25, 2022, 38 pages.

* cited by examiner

MOBILE DEVICE ID TRACKING FOR AUTOMATIC INCIDENT DATA ASSOCIATION AND CORRELATION

BACKGROUND

Law enforcement officers generally carry multiple body-worn electronic devices as they perform their law enforcement functions. For example, law enforcement agencies are increasingly mandating that their police officers carry and use portable recording devices to record their interactions with the public. The recordings may serve to protect the public from improper policing, as well as protect law enforcement officers from false allegations of police misconduct. Other examples of electronic devices that are carried by a law enforcement officer may include a radio, a smartphone, a biometric monitor, a non-lethal electronic shock weapon, and electronic add-on sensors for the officer's primary weapon, i.e., a gun. The add-on sensors may include a sensor that detects the unholster of an officer's gun from its holster or a sensor that detects the firing of the officer's gun. While these electronic devices are designed to aid the officer in performing his or her duties in protecting and serving the public, they are often configured to work independently of one another.

SUMMARY

Described herein are techniques for law enforcement agencies to track mobile device identifiers (IDs) of mobile devices that are present at various geolocations and correlate such mobile device IDs to incidents. Such tracking and correlation may be used to identify suspicious mobile devices IDs of mobile devices that may belong to potential suspects or persons of interest that are commonly present near more than one incident when such incidents occurred. The mobile device IDs may be detected by mobile hubs that are operated by law enforcement officers. The mobile hubs may include vehicle hubs that are installed in law enforcement vehicles and/or body-worn hubs that are worn on the bodies of law enforcement officers. For example, the mobile device IDs that are detected by the mobile hubs may include Bluetooth device IDs of Bluetooth devices, Wi-Fi device IDs of Wi-Fi devices, International Mobile Subscriber Identities (IMSIs) and/or International Mobile Equipment Identities (IMEIs) of cellular devices, and/or so forth. The incidents may include any incident that is reported to a law enforcement agency or observed by law enforcement officers.

In some embodiments, an incident may have occurred at a particular geolocation at a particular date and time. Accordingly, a network operation center (NOC) application may identify any mobile device IDs corresponding to the mobile hubs of law enforcement officers that were present in a selected geographical zone, in which the selected geolocation zone that includes the geolocation where the incident occurred during a selected time frame that includes the particular date and time. Subsequently, the NOC application may associate the data recorded by the user devices communicatively connected to the mobile hubs that were identified by their mobile device IDs as being present in the selected geographical zone during the particular date and time with the incident. For example, the user devices may include body-worn devices that are communicatively connected to a body-worn hub, such as a body camera that recorded an audiovisual recording, a smartphone that recorded audio communication, background noise, and/or so forth. The data may include data that is stored in a NOC data store or data that may be uploaded to the NOC data store at a future date. The NOC application may include a reviewing function that enables a law enforcement officer to review the various data for any information that may be relevant to the incident.

In other embodiments, the NOC application may further identify any mobile device IDs of non-law enforcement officer devices that are present within an additional selected geographical zone that includes the particular geolocation during an additional selected time frame that includes the particular date and time, as well as present within a defined proximity to one or more geolocations of one or more similar incidents within identical or similar time frames. Accordingly, such identified mobile device IDs may be designated by the NOC application as suspicious mobile device IDs of user devices that may belong to potential suspects or persons of interest associated with the incidents. Thus, the NOC application may send such suspicious mobile device IDs to one or more mobile hubs. In some instances, the NOC application may be used to map the locations of the suspicious mobile devices on a geographical map to depict the geolocations and/or movements of such devices during the occurrence of one or more incidents.

In additional embodiments, a mobile hub may determine that the mobile hub is within a predetermined distance of a mobile device with a suspicious mobile device ID. Accordingly, the mobile hub may generate an alert that indicates the presence of such a mobile device for display via a user device communicatively connected to the mobile hub. In some instances, the mobile hub may also generate a command for one or more user devices to record sensor data until the mobile hub is no longer within the predetermined distance of the mobile device with the suspicious mobile device ID.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
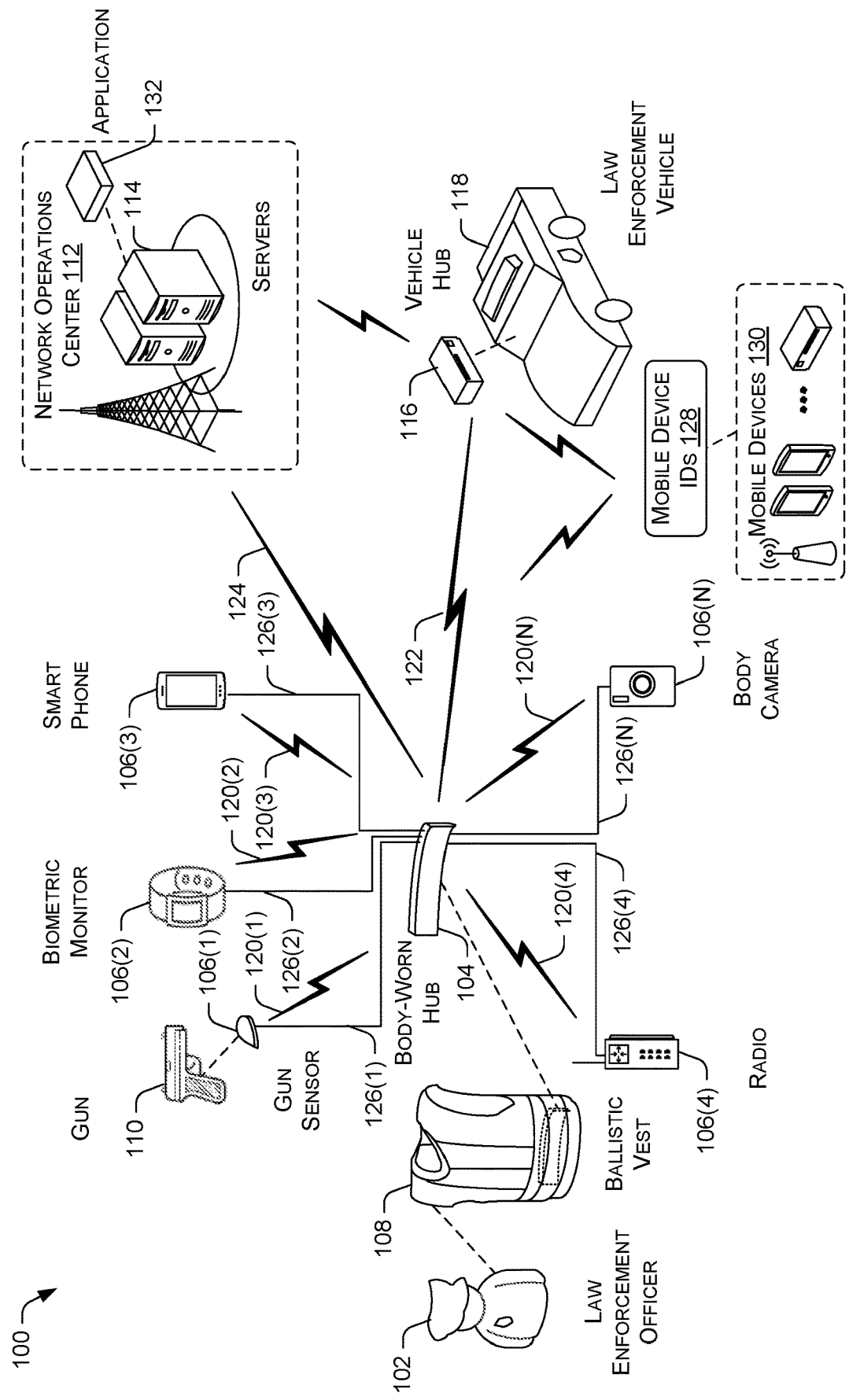
FIG. 1 illustrates an example environment for implementing mobile device identifier (ID) tracking for automatic incident data association and correlation.

Described herein are techniques for law enforcement to track mobile device identifiers (IDs) of mobile devices that are present at various geolocations and correlate such mobile device IDs to incidents. Such tracking and correlation may be used to identify suspicious mobile devices IDs of mobile devices that may belong to potential suspects or persons of interest that are commonly present near more than one incident at times such incidents occurred. The mobile device IDs may be detected by mobile hubs that are operated by law enforcement officers. The mobile hubs may include vehicle hubs that are installed in law enforcement vehicles and/or body-worn hubs that are worn on the bodies of law enforcement officers. For example, the mobile device IDs that are detected by the mobile hubs may include Bluetooth device IDs of Bluetooth devices, Wi-Fi device IDs of Wi-Fi devices, IMSI and/or IMEI of cellular devices, and/or so forth. The incidents may include any incident that is reported to law enforcement or observed by law enforcement officers.

In various embodiments, a body-worn hub may be a standalone device that is worn on the body of the law enforcement officer. In other instances, the body-worn hub may be integrated into another garment, or another piece of equipment already worn by the law enforcement officer, such as a ballistic vest, a body camera, etc. Each set of components may include hardware components, software components, or a combination of software and hardware components. The short-range wireless communication components may enable the body-worn hub to exchange communications with the various body-worn devices via short-range wireless communication, such as Bluetooth, ultra-wide band (UWB), or Wi-Fi, as well as exchange communications with a remote hub, such as a vehicle hub in a law enforcement vehicle of the officer or a hub associated with another law enforcement officer. The long-range wireless communication components may enable the body-worn hub to exchange communications with a computing device at a network operations center (NOC) via long-range wireless communication, such as cellular or satellite communication.

In some embodiments, an incident may have occurred at a particular geolocation at a particular date and time. Accordingly, a NOC application may identify any mobile device IDs corresponding to the mobile hubs of law enforcement officers that were present in a selected geographical zone, in which the selected geographical zone includes the geolocation where the incident occurred during a selected time frame that includes the particular date and time. Subsequently, the NOC application may associate the data recorded by the user devices communicatively connected to the mobile hubs that were identified by their mobile device IDs as being present in the selected geographical zone during the particular date and time with the incident. For example, the user devices may include body-worn devices that are communicatively connected to a body-worn hub, such as a body camera that recorded audiovisual recording, a smartphone that recorded audio communication, background noise, etc., and/or so forth. The data may include data that is stored in a NOC data store or data that may be uploaded to the NOC data store at a future date. The NOC application may include a reviewing function that enables a law enforcement officer to review the various data for any information that may be relevant to the incident.

In other embodiments, the NOC application may further identify any mobile device IDs of non-law enforcement officer devices that are present within an additional selected geographical zone that includes the particular geolocation during an additional selected time frame that includes the particular date and time, as well as present within a defined proximity to one or more geolocations of one or more similar incidents within identical or similar time frames. Accordingly, such identified mobile device IDs may be designated by the NOC application as suspicious mobile device IDs of user devices that may belong to potential suspects or persons of interest associated with the incidents. Thus, the NOC application may send such suspicious mobile device IDs to one or more mobile hubs. In some instances, the NOC application may be used to map the locations of mobile devices with the suspicious mobile device IDs on a geographical map to depict the geolocations and/or movements of such devices during the occurrence of one or more incidents.

In additional embodiments, a mobile hub may determine that the mobile hub is within a predetermined distance of a mobile device with a suspicious mobile device ID. Accordingly, the mobile hub may generate an alert that indicates the presence of such a mobile device for display via a user device communicatively connected to the mobile hub. In some instances, the mobile hub may also generate a command for one or more user devices to record sensor data until the mobile hub is no longer within the predetermined distance of the mobile device with the suspicious mobile device ID.

The use of mobile device identifier (ID) tracking for automatic incident data association and correlation may enable law enforcement agencies to identify suspicious mobile devices IDs of mobile devices that may belong to potential suspects or persons of interest that are commonly present near more than one incident at times such incidents occurred. Such correlation and mobile device identification may provide law enforcement agencies with additional information for detecting illegal activities, contacting witnesses, solving crimes and/or identifying perpetrators that are the root causes of incidents. Example implementations are provided below with reference to FIGS. 1-7.

Example Environment

FIG. 1 illustrates an example environment for implementing mobile device identifier (ID) tracking for automatic incident data association and correlation. The environment 100 may include a law enforcement officer 102 that is equipped with a body-worn hub 104 and multiple body-worn devices 106(1)-106(N). In some embodiments, the body-worn hub 104 may be a standalone device that is worn by the law enforcement officer 102. In other embodiments, the body-worn hub 104 may be integrated into a garment or a piece of equipment that is worn by the law enforcement officer 102. For example, the body-worn hub 104 may be integrated into a ballistic vest 108 that is worn by the law enforcement officer 102. The body-worn device 106(1)-106(N) may include various devices that are carried by the law enforcement officer 102. For example, the body-worn device 106(1) may be a gun sensor that is attached to a gun 110 or a holster for the gun 110, such that the gun sensor may detect whether the gun 110 is holstered unholstered, cocked, decocked, fired, misfired, dropped, and/or so forth. The body-worn device 106(2) may be a biometric monitor (e.g., a smartwatch) that monitors the vital signs of the law enforcement officer 102, such as body temperature, blood pressure, heart rate, etc. The body-worn device 106(3) may be a smartphone that is carried by the law enforcement officer 102. The body-worn device 106(4) may be a radio that the law enforcement officer 102 uses to communicate with a network operations center (NOC) 112. The body-worn device 106(N) may be a body camera that is capable of capturing audiovisual recording, e.g., video, of scenes and events encountered by the law enforcement officer 102. The NOC 112 may include servers 114 that implement a computer-assisted dispatch platform, a data processing platform, and a data file storage platform. For example, the NOC 112 may be a part of a police station or an emergency assistance dispatch center. The servers 114 may be physical servers located at the NOC 112 or virtual servers that are implemented in a cloud.

Each of the body-worn devices 106(1)-106(N) may have short-range wireless communication capabilities, such as Bluetooth, UWB, Wi-Fi, etc., and/or long-range wireless communication capabilities, such as cellular, satellite, etc. The cellular and satellite communication capabilities may be provided by respective cellular or satellite service providers. In some instances, a body-worn device may be capable of using the short-range wireless communication capabilities to communicate with another body-worn device or a hub, such as the body-worn hub 104. In other instances, a body-worn device may be capable of using the long-range wireless communication capabilities to communicate with the hub or the servers 114 of the NOC 112. Additionally, each of the body-worn devices 106(1)-106(N) may be equipped with an electrically conductive coupling port that enables the device to send power to and receive power from another device, as well as exchange communication with another device. For example, the electrically conductive coupling port may be a mating receptacle that is configured to accept a mating plug of an electrically conductive wired connector, in which the wired connector includes a set of one or more electrically conductive wires or cables sufficient to complete an electrical circuit between two devices. However, in other implementations, the mating receptacle and plug may be substituted with other detachable connection mechanisms, such as a magnetic electrical connection mechanism. In some embodiments, the body-worn device may use the electrically conductive coupling port to send and receive communication that is encoded using digital and/or analog signals.

The body-worn hub 104 may have similar short-range and long-range wireless communication capabilities. In some instances, the body-worn hub 104 may be capable of using the short-range wireless communication capabilities to communicate with another body-worn device or a remote hub, such as the vehicle hub 116 in the law enforcement vehicle 118. For instance, the body-worn hub 104 may establish short-range wireless communication links 120(1)-120(N) with the body-worn devices 106(1)-106(N), respectively. In this way, the body-worn hub 104 and the body-worn devices 106(1)-106(N) may form a wireless mesh network of user devices. The body-worn devices 106(1)-106(N) and the body-worn hub 104 may use the short-range wireless communications links 120(1)-120(N) to exchange communication. For example, the body-worn devices 106(1)-106(N) may use the short-range wireless communications links 120(1)-120(N) to send event data of events detected or recorded by the sensors of the body-worn devices 106(1)-106(N) to the body-worn hub 104. Conversely, the body-worn hub 104 may use the short-range wireless communications links 120(1)-120(N) to send commands to the body-worn devices 106(1)-106(N) that trigger one or more of the body-worn devices 106(1)-106(N) to perform one or more actions in response to events that are detected.

As examples, the events that are detected or recorded by the sensors may include the gun sensor 106(1) detecting that a gun 110 of the law enforcement officer 102 is unholstered or holstered, an accelerometer in the smartphone 106(3) detecting that the officer is running, walking, or remaining still for a predetermined period of time, the biometric monitor 106(2) detecting that the heart rate of law enforcement officer 102 exceeding or falling below a predetermined rate threshold, an impact sensor in the ballistic vest 108 detecting an impact, and/or so forth. Thus, the events that are detected may include discrete events, such as a gun being unholstered or holstered, or a series of continuous events, such as a series of heart rate readings or body temperature readings. Further, the event notification for an event may include one or more predetermined encoded values that correspond to the occurrence of the event. The event notification for an event may also be accompanied by sensor data that are captured by a sensor of a body-worn device for the event. For example, the sensor data may include audio data, video data, multimedia data, and/or so forth.

In another instance, the body-worn hub 104 may establish a short-range wireless communication link 122 with the vehicle hub 116, so that communications may be exchanged between the body-worn hub 104 and the vehicle hub 116. For example, the body-worn hub 104 may use the short-range wireless communication link 122 to send event data of events detected or recorded by the sensors of the body-worn devices 106(1)-106(N) to the vehicle hub 116, such as for data processing and/or backup purposes. Conversely, the vehicle hub 116 may use the short-range wireless communication link 122 to send commands to the body-worn hub 104. The commands may trigger one or more of the body-worn devices 106(1)-106(N) that are connected to the body-worn hub 104 to perform one or more actions in response to events that are detected. In other instances, the body-worn hub 104 may be capable of using the long-range wireless communication capabilities to communicate with a remote hub, such as the vehicle hub 116, or the servers 114 of the NOC 112. For instance, the body-worn hub 104 may establish a long-range wireless communication link 124 with the servers 114 of the NOC 112. In such an instance, the long-range wireless communication link 124 may be used by the body-worn hub 104 to send event data of events detected or recorded by the sensors of the body-worn devices 106 (1)-106(N) to the servers 114 of the NOC 112. Conversely, the servers 114 may use the long-range wireless communication link 124 to send commands to the body-worn hub 104. The commands may trigger one or more of the body-worn devices 106(1)-106(N) that are connected to the body-worn hub 104 to perform one or more actions in response to events that are detected.

Additionally, the body-worn hub 104 may be equipped with a set of electrically conductive coupling ports that are similar to those featured on the body-worn devices 106(1)-106(N), in which a coupling port is a receptacle that may accept the mating plug of an electrically conductive wired connector that connects the body-worn hub to a body-worn device. However, in other implementations, the set of mating receptacles and plugs may be substituted with other detachable connection mechanisms, such as a magnetic connection mechanism. In this way, the body-worn hub 104 may send power to and receive power from the body-worn devices 106(1)-106(N), as well as exchange communication with the body-worn devices 106(1)-106(N) via wired connections. For example, the body-worn hub 104 may be connected to the body-worn devices 106(1)-106(N) via respective electrically conductive wired connectors 126(1)- 126(N). In other words, the electrically conductive wired connectors 126(1)-126(N) may enable the body-worn hub 104 and the body-worn devices 106(1)-106(N) to form a wired mesh network.

In further embodiments, the body-worn hub 104 may be configured such that the hub will automatically stop using wireless communication with a body-worn device and default to using wired communication when an electrically conductive wired connection is made between the body-worn hub and the body-worn device. The wired communication may enable at least the same data to be exchanged between the body-worn hub 104 and the body-worn device as the wireless communication. For example, when a wired communication link is established between the body-worn hub 104 and the gun sensor 106(1) via the wired connector 126(1), the body-worn hub 104 may automatically terminate an existing wireless communication link 120(1) between the body-worn hub 104 and the gun sensor 106(1). However, when the electrically conductive wired connection between the body-worn hub and the body-worn device is disconnected, the body-worn hub 104 may automatically switch to using wireless communication with the body-worn device. For example, when the wired communication link between the body-worn hub 104 and the gun sensor 106(1) is terminated due to the disconnection of the wired connector 126(1), the body-worn hub 104 may reestablish the wireless communication link 120(1) with the gun sensor 106(1).

The body-worn hub 104 may process the event data that the hub receives from one or more body-worn devices, such as one or more of the body-worn devices 106(1)-106(N), to determine whether to trigger the performance of actions by at least one body-worn device of the 106(1)-106(N). In some embodiments, the body-worn hub 104 may include a software event handler that processes event data and generate commands for the connected body-worn devices. For example, the body-worn hub 104 may trigger the body camera 106(N) of a law enforcement officer 102 to start a video recording when the body-worn hub 104 is notified by the gun sensor 106(1) that the officer's gun is unholstered.

Additionally, a mobile hub, such as a body-worn hub or a vehicle hub may have the ability to detect mobile device IDs (e.g., mobile device IDs 128) of mobile devices (e.g., mobile devices 130) that are present in the vicinity of the hub. For example, the mobile device IDs may be identifiers that are broadcasted by the mobile devices via radio signals as the mobile devices communicate or attempt to establish communication with other mobile devices. For example, the mobile device IDs that are detected by a mobile hub may include Bluetooth device IDs of Bluetooth devices (e.g., Bluetooth media access control (MAC) addresses), Wi-Fi device IDs of Wi-Fi devices (e.g., MAC addresses, Service Set Identifiers (SSIDs), etc.), IMSIs, IMEIs, or some other electronic identifiers (e.g., MAC addresses) of cellular devices, and/or so forth. When a mobile hub detects a mobile device ID of a mobile device, the mobile hub may collect device detection information associated with the mobile device ID. The device detection information may include the mobile device ID, an approximate geolocation of the mobile device with the mobile device ID, a date and time that the mobile device ID is detected, a signal strength measurement of the radio signal that broadcasted the mobile device ID, any additional device identification information associated with the mobile device ID, and/or so forth.

Further, a mobile hub may also store hub itinerary information as it collects the device detection information. The hub itinerary information store by the mobile hub may track the geolocations of the mobile hub at various dates and times as the mobile hub roams around a patrol area. Alternatively, or concurrently, a mobile hub may receive device detection information from various body-worn devices communicatively connected to the mobile hub that are capable of detecting such information, such as the smartphone 106(3). The mobile hub may upload the device detection information and the hub itinerary information in real-time or on a periodic basis to the servers 114 of the NOC 112. In turn, the NOC 112 may store such information in a data store of the NOC 112.

In some embodiments, a application 132 executing on the servers 114 of the NOC 112 may record an incident as having occurred at a particular geolocation at a particular date and time. In some instances, an incident may be recorded by the application 132 based on incident data inputted by an administrator via an interface portal. The incident data may include a description of the incident, an incident classification of the incident, a date and time of occurrence for the incident, an incident identifier, and/or so forth. In other instances, an incident may be automatically tracked and classified by the application 132 based on information that is extracted by the application 132 from police reports filed by law enforcement officers, reports filed by other emergency responders, emergency responder dispatch logs, and/or other electronic sources that are accessible or stored by the NOC 112.

Following the recording of an incident as having occurred at a particular geolocation at a particular date and time, the application 132 may identify any mobile device IDs corresponding to the mobile hubs of law enforcement officers that were present in a selected geographical zone that includes the geolocation where the incident occurred during a selected time frame that includes the particular date and time. The selected geographical zone may be a zone that is custom selected for the incident or a zone that is defined as being of a predetermined radius around the particular geolocation of the incident. For example, the custom geographical zone may be a geofenced zone of any size and/or shape that includes the particular geolocation of the incident. The selected time frame may be a time frame that is custom selected for the incident or a time frame that is predefined as including a first amount of time before an occurrence of the incident and/or a second amount of time following the occurrence of the incident. Once one or more such mobile hubs are identified, the application 132 may associate the data recorded by the user devices communicatively connected to the mobile hubs that were present in the selected geographical zone during the particular date and time with the incident. For example, the user devices may include body-worn devices that are communicatively connected to a body-worn hub, such as a body camera (e.g., the body camera 106(N)) that recorded audiovisual recording, a smartphone that recorded audio communication, background noise, etc., and/or so forth. In another example, the user devices may include vehicle devices that are communicatively connected to a vehicle hub (e.g., the vehicle hub 116) of a law enforcement vehicle, such as a vehicle camera that recorded audiovisual recording from a vantage point towards the front of a law enforcement vehicle. The data may include data that is stored in a NOC data store or data that may be uploaded to the NOC data store at a future date that is within a predefined date range. In some instances, the application 132 may include a reviewing function that enables a law enforcement officer to review the various data for any information that may be relevant to the incident.

In other embodiments, the application 132 may further identify any mobile device IDs of non-law enforcement officer devices that are present within an additional selected geographical zone that includes the particular geolocation during an additional selected time frame that includes the particular date and time, as well as present within a defined proximity to one or more geolocations of one or more similar incidents within identical or similar time frames. For example, an identical time frame is a time frame that covers the same amount of time as the additional selected time frame (e.g., ten minutes, an hour, etc.) and/or occurs at around the same time of day (e.g., evening, morning, etc.) as the additional selected time frame. The additional selected geographical zone may be a zone that is custom selected for the incident or a zone that is defined as being of a predetermined radius around the particular geolocation of the incident. For example, the custom selection may be a geofenced zone of any size and/or shape that includes the particular geolocation of the incident. Likewise, the additional selected time frame may be a time frame that is custom selected for the incident or a time frame that is predefined as including a first amount of time before an occurrence of the incident and/or a second amount of time following the occurrence of the incident. The additional selected geographical zone may be identical to or different from the selected geographical zone used to associate data from one or more mobile hubs with the incident. Likewise, the additional selected time frame may be identical to or different from the selected time frame used to associate data from one or more mobile hubs with the incident. In some instances, the defined proximity for the one or more geolocations of one or more similar incidents may define a geographical region for each similar incident that surrounds the corresponding geolocation where the incident occurred, as well as being identical or similar in surface area to the additional selected geographical zone.

Accordingly, such identified mobile device IDs may be designated by the application 132 as suspicious mobile device IDs of mobile devices that may belong to potential suspects or persons of interest associated with the incidents. Thus, the application 132 may send such suspicious mobile device IDs to one or more mobile hubs. In some instances, the application 132 may be used to map the locations of the mobile devices with mobile device IDs on a geographical map to depict the geolocations and/or movements of such devices during the occurrence of one or more incidents.

In additional embodiments, a mobile hub may determine that the mobile hub is within a predetermined distance of a mobile device with a suspicious mobile device ID. Accordingly, the mobile hub may generate an alert that indicates the presence of such a mobile device for display via a user device communicatively connected to the mobile hub. For example, the body-worn hub 104 may generate such an alert for display on the smartphone 106(3). In some instances, the mobile hub may also generate a command for one or more user devices to record sensor data until the mobile hub is no longer within the predetermined distance of the mobile device with the suspicious mobile device ID. For example, the vehicle hub 116 may command an external-facing video camera installed in the law enforcement vehicle 118 to record video footage. Following the transfer of such sensor data to servers 114 of the NOC 112, such footage may be tagged by the NOC application as having some relevance to the incident or a similar incident. Thus, a law enforcement officer investigating the incident, or a similar incident, may have the opportunity to initiate a review of the sensor data recorded by the one or more user devices.

Example Body-Worn Device Components

Figure 2:
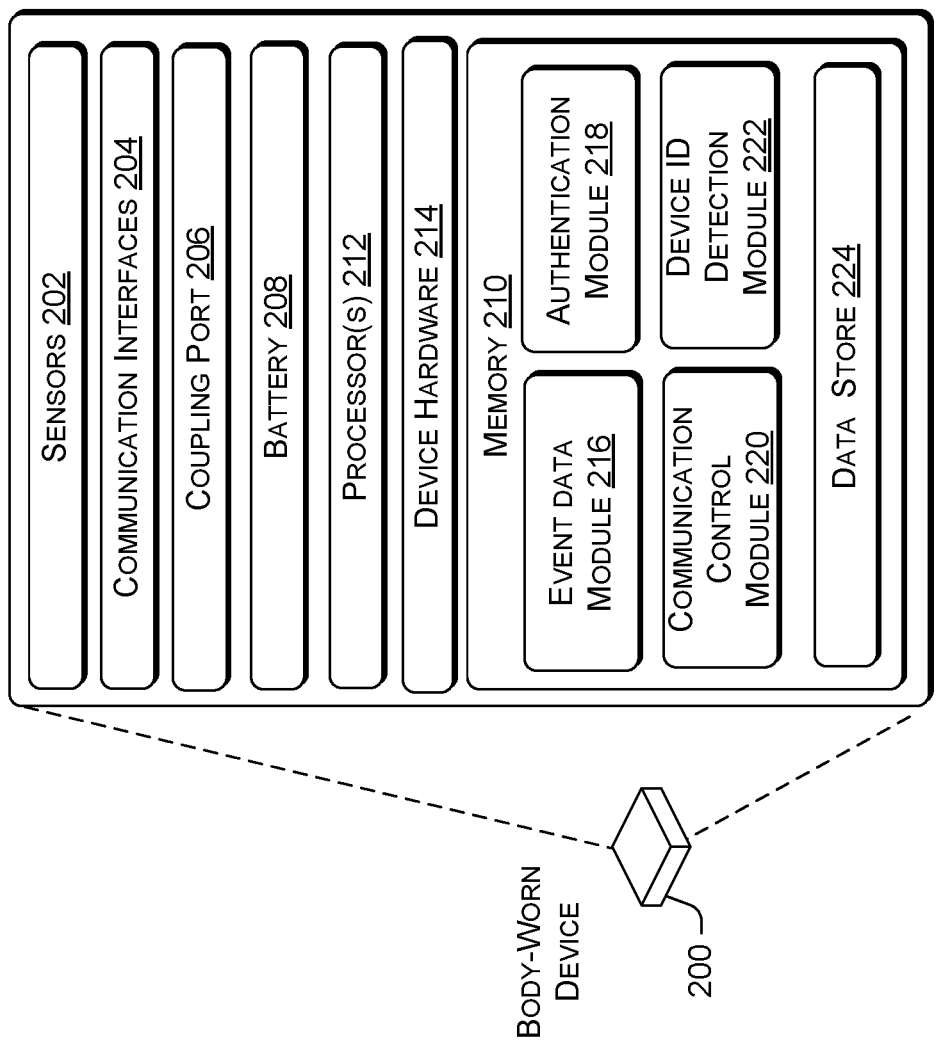
FIG. 2 is a block diagram showing various components of a body-worn device that participates in mobile device ID tracking for automatic incident data association and correlation.

FIG. 2 is a block diagram showing various components of a body-worn device that participates in mobile device ID tracking for automatic incident data association and correlation. The body-worn device 200 may be equipped with one or more sensors 202, communication interfaces 204, an electrically conductive coupling port 206, a battery 208, memory 210, one or more processors 212, and device hardware 214. The sensors 202 may include a compass, an accelerometer, one or more pressure sensors, a global positioning system (GPS) sensor, an audio sensor, a video sensor, and/or so forth. The communication interfaces 204 may include short-range wireless transceivers (e.g., Bluetooth, UWB, Wi-Fi, and/or so forth) and long-range wireless transceivers (e.g., cellular, satellite, and/or so forth) that enable the body-worn device 200 to wirelessly communicate with other devices. The electrically conductive coupling port 206 may be configured to accept an electrically conductive wired connector. The wired connector may be used by the body-worn device 200 to receive power input to the body-worn device 200 from an external source, output power from the body-worn device 200 to an external load, as well as perform wired communication.

The memory 210 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 214 may include user interface hardware, such as physical buttons, a gesture recognition mechanism, or a voice activation mechanism. The device hardware 214 may further include signal converters, antennas, modems, hardware decoders and encoders, graphic processors, digital signal processors, microprocessors, power routing circuitry, a real-time clock (RTC) circuit, and/or so forth. The device hardware 214 may enable the body-worn device 200 to exchange wired or wireless communication with other devices via the communication interfaces 204, as well as receive power or output power via the electrically conductive coupling port 206 based on software instructions.

The processors 212 and the memory 210 of the body-worn device 200 may implement an event data module 216, an authentication module 218, a communication control module 220, and a device ID detection module 222. These modules may include routines, program instructions, objects, and/or data structures that perform particular tasks or implement particular abstract data types. The memory 210 may further store software (e.g., drivers, applications, firmware, etc.) that support various functionalities of the body-worn device 200, such as software that are executed by the processors 212 to support the establishment of wired and wireless communication links. The memory 210 may also provide a data store 224 that is capable of storing event data. The event data may include sensor data captured by the sensors 202, associated metadata for the sensor data, and/or so forth. In some embodiments, an operating system may also be implemented via the one or more processors 212 and the memory 210 to perform various functions, as well as provide an execution environment that supports the executions of applications and modules.

The event data module 216 may send event data that includes event notifications of detected events and/or sensor data associated with the events to the body-worn hub 104, the vehicle hub 116, or the servers 114 of the NOC 112. The vehicle hub 116 may relay communications from other devices and hubs to the server 114, and vice versa. The event data module 216 may send the event data to the body-worn hub 104 via available wired communication or alternatively via short-range wireless communication. However, event data that are destined for the vehicle hub 116 or the servers 114 are sent via short-range or long-range wireless communication. In turn, the event data module 216 may receive commands for the body-worn device 200 to perform specific actions. For example, such actions may include activating or deactivating one or more specific sensors, built-in functions, software applications, hardware components, and/or so forth of the body-worn device 200.

The authentication module 218 may handle the authentication of the body-worn device 200 to various hubs and the server 114 of the NOC 112 so that the body-worn device 200 may exchange wireless communication with the various hubs and the server 114. In order to establish a wireless communication link with a hub, the authentication module 218 may use a device authentication credential (e.g., a device identifier, a secret code, a key, a digital certificate, and/or so forth) to authenticate the body-worn device 200 to the hub. Alternatively, or concurrently, the hub may provide a hub authentication credential to the authentication module 218 so that the module may authenticate the body-worn hub. Accordingly, the authentication module 218 may determine that the hub authentication credential of the hub is valid when the hub authentication credential matches an authorized hub authentication credential stored in the data store 224. The data store 224 may contain a list of hub authentication credentials that may be updated or modified by the server 114 of the NOC 112. In some embodiments, the authentication module 218 may also be configured to perform a secret key exchange with a hub or a server so that a corresponding secret key can be used to encrypt and decrypt the secured communication exchanged.

The communication control module 220 may switch the body-worn device 200 between using the short-range wireless transceiver and the electrically conductive coupling port 206 to exchange communications with the body-worn hub 104. The communication control module 220 may use the authentication module 218 to perform authentication in order to establish a short-range wireless communication link with the body-worn hub 104. In some embodiments, the communication control module 220 may automatically terminate a short-range wireless communication link that is established with the body-worn hub 104 when a wired connection is established with the body-worn hub 104 via the electrically conductive coupling port 206. For example, the communication control module 220 may detect that the body-worn device 200 is connected to another device via a wired connector by a detected change in one or more electrical properties (e.g., voltage, resistance, and/or current) at the electrically conductive coupling port 206. As a result, the communication control module 220 may terminate the short-range wireless communication link by powering off the short-range wireless transceiver.

In other embodiments, the communication control module 220 may further use a wired communication protocol (e.g., Universal Serial Bus (USB) protocol, TCP/IP, or some other wired communication protocol) to establish a wired communication link with the body-worn hub 104 over the wired connection. In some instances, the communication control module 220 may wait for the body-worn hub 104 to initiate the establishment of the wired communication link using the wired communication protocol. However, in other instances, the communication control module 220 may initiate the establishment of the wired communication link with the body-worn hub 104 using the wired communication protocol. Once the wired communication link is established, the communication control module 220 may terminate the short-range wireless communication link by powering off the short-range wireless transceiver.

In still other embodiments, the communication control module 220 may terminate the short-range wireless communication link when a short-range wireless communication termination command is received from the body-worn hub 104. The communication control module 220 may receive the termination command when a wired connection is established between the body-worn device 200 and the body-worn hub 104 via the electrically conductive coupling port 206. The termination command may be received via the wired connection between the body-worn device 200 and the body-worn hub 104. Accordingly, the communication control module 220 may terminate the short-range wireless communication by powering off the short-range wireless transceiver. However, in other instances, the body-worn hub 104 may simply terminate the short-range wireless communication link between the body-worn device 200 and the body-worn hub 104 at its end once the wired connection is established between the body-worn device 200 and the body-worn hub 104. In some instances, following the power off of the short-range wireless transceiver, the communication control module 220 may send a short-range wireless transceiver termination confirmation to the body-worn hub 104 via the electrically conductive coupling port 206.

Conversely, when the communication control module 220 detects that the wired connection between the body-worn device 200 and the body-worn hub 104 is terminated, the communication control module 220 may power on the short-range wireless transceiver. For example, the one or more electrical properties at the electrically conductive coupling port 206 may indicate to the communication control module 220 that the wired connection is severed. The powering on of the short-range wireless transceiver may enable the body-worn device 200 to reestablish a short-range wireless communication link with the body-worn hub 104.

In some embodiments, the body-worn device 200 may be configured by default to communicatively link with the body-worn hub 104 because they are both assigned to the law enforcement officer 102. However, when the communication control module 220 is unable to establish communication with the body-worn hub 104, the module is configured to attempt to establish short-range wireless communication with an alternative hub. The alternative hub may be a vehicle hub that is assigned to the law enforcement officer 102, a body-worn hub of another law enforcement officer, a vehicle hub of another law enforcement officer, etc. As a last resort and if the body-worn device 200 is capable, the communication control module 220 may be configured to attempt to directly establish communication with a server 114 of the NOC 112 via a long-range wireless communication link. When there are multiple alternative hubs within short-range wireless communication range, the communication control module 220 may be configured to wirelessly link with an alternative hub that is presenting a strongest wireless communication signal strength to the body-worn device 200. The communication control module 220 may use the authentication module 218 to perform authentication with the alternative hub in order to form the wireless communication connection.

The device ID detection module 222 may use the short-range transceivers and the long-range transceivers of the body-worn device 200 to detect mobile device IDs of mobile devices that are within proximity of the body-worn device 200. The mobile device IDs that are detected by the device ID detection module 222 may include identifiers that are broadcasted by the mobile devices via radio signals as the mobile devices communicate or attempt to establish communication with other mobile devices. For example, the mobile device IDs that are detected by a hub may include Bluetooth device IDs of Bluetooth devices (e.g., Bluetooth MAC addresses), Wi-Fi device IDs of Wi-Fi devices (e.g., MAC addresses, SSIDs, etc.), IMSIs, IMEIs, or some other electronic identifiers (e.g., MAC addresses) of cellular devices, and/or so forth. In some embodiments, the device ID detection module 222 may cause the body-worn device 200 to act as a virtual base station in order to identify the mobile device IDs of nearby cellular devices.

The device ID detection module 222 may use various techniques to determine a geolocation of a mobile device with a detected mobile device ID. In some instances, the geolocation of the mobile device may be determined using signal triangulation based on the signal strength measurements obtained for the radio signal that broadcasted the detected mobile device ID. For example, the signal triangulation may provide an estimated position of the mobile device relative to the position of the body-worn device 200, as well as the distance between the two positions. The estimated position is then translated by the device ID detection module 222 into a geolocation for the mobile device using map data. In additional instances, the geolocation of the mobile device may be determined using Wi-Fi position (WPS), which is the use of the known geolocations of Wi-Fi hotspots and wireless access points that are near a Wi-Fi mobile device to approximate where the Wi-Fi mobile device is located. In other instances, the geolocation of the mobile device may be determined based on geolocation information provided by a mobile device in response to a geolocation request sent by the device ID detection module 222. In this way, the device ID detection module 222 may compile device detection information for each detection of a mobile device ID for transmission to a mobile hub, such as a body-worn hub or a vehicle hub. The device detection information associated with a detection of a mobile device ID may include the mobile device ID, an approximate geolocation of the mobile device with the mobile device ID, a date and time that the mobile device ID is detected, a signal strength measurement of the radio signal that broadcasted the mobile device ID, any additional device identification information associated with the mobile device ID, and/or so forth. The device detection information may be sent by the device ID detection module 222 on a continuous basis or in discrete blocks that correspond to multiple time periods, such as every 5 minutes, every 10 minutes, every 20 minutes, etc. Further, while FIG. 2 describes a body-worn device 200, a device that is mounted on a vehicle may have similar hardware and software components and function in a similar manner.

Example Mobile Hub Components

Figure 3:
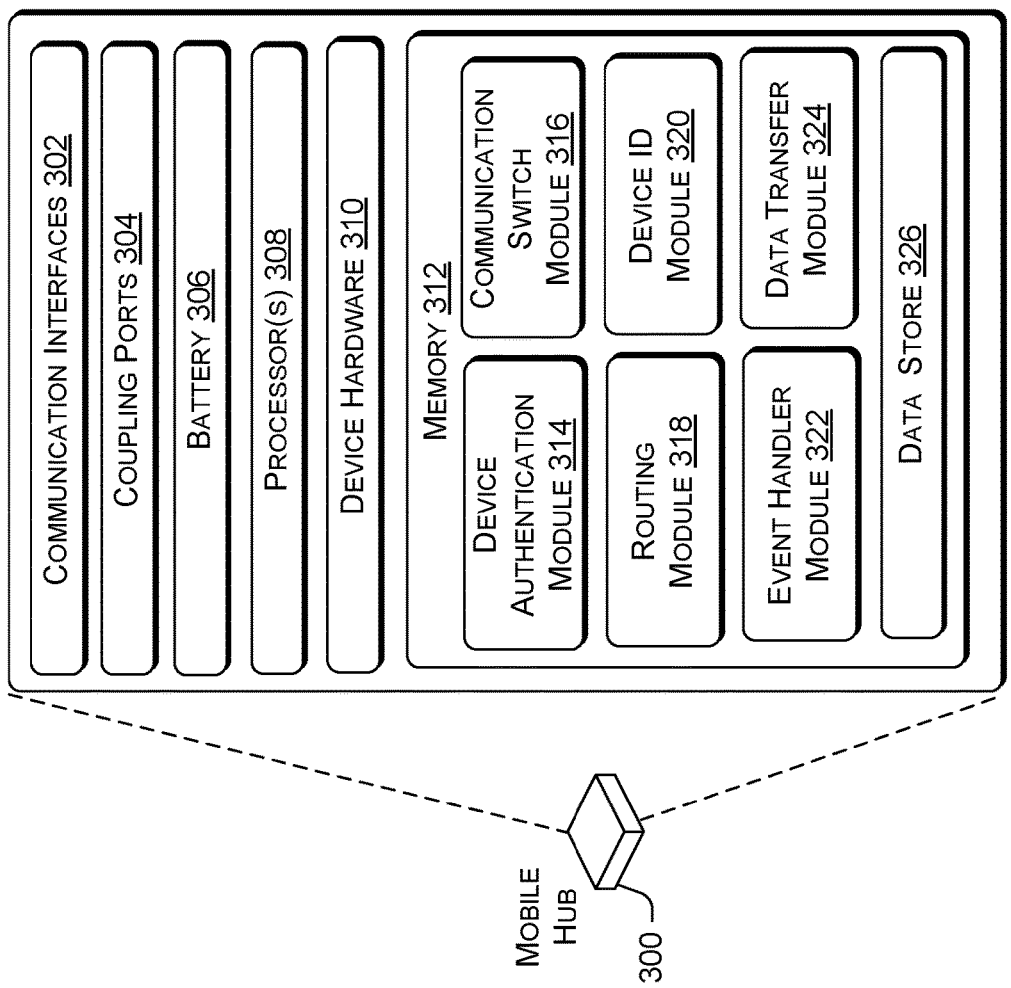
FIG. 3 is a block diagram showing various components of a mobile hub that participates in mobile device ID tracking for automatic incident data association and correlation.

FIG. 3 is a block diagram showing various components of a mobile hub that participates in mobile device ID tracking for automatic incident data association and correlation. In various embodiments, the mobile hub 300 may be a body-worn hub or a vehicle hub. The mobile hub 300 may be equipped with communication interfaces 302, a set of electrically conductive coupling ports 304, a battery 306, one or more processors 308, device hardware 310, and/or memory 312. The communication interfaces 302 may include one or more short-range wireless communication transceivers (e.g., Bluetooth, UWB, Wi-Fi transceivers, and/or so forth), and/or one or more long-range wireless communication transceivers (e.g., cellular, satellite, and/or so forth). Each of the electrically conductive coupling ports 304 may be configured to accept an electrically conductive wired connector. The wired connector may be used by the mobile hub 300 to receive power input from an external source, output power to an external load, as well as for performing wired communications. Generally speaking, the battery 306 of the mobile hub 300 is configured to have a larger battery capacity than the batteries of the body-worn device.

The device hardware 310 may include signal converters, antennas, modems, hardware decoders and encoders, digital signal processors, an RTC circuit, and/or so forth that enable the mobile hub 300 to execute applications and exchange data with other devices, such as the body-worn devices 106(1)-106(N), via wired or wireless communication.

The memory 312 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 308 and the memory 312 of the mobile hub 300 may implement a device authentication module 314, a communication switch module 316, a routing module 318, a device ID module 320, an event handler module 322, and a data transfer module 324. These modules may include routines, program instructions, objects, and/or data structures that perform particular tasks or implement particular abstract data types. The memory 312 may further store software (e.g., drivers, applications, firmware, etc.) that support various functionalities of the mobile hub 300, such as software that are executed by the processors 308 to support the establishment of wired and wireless communication links. The memory 312 may also provide a data store 326. The data store 326 may store the event data collected by the body-worn devices 106(1)-106(N). In some embodiments, an operating system may also be implemented via the one or more processors 308 and the memory 312 to perform various functions, as well as provide an execution environment that supports the executions of applications and modules.

The device authentication module 314 may authenticate various body-worn devices so that the hub may exchange wireless communication with the various body-worn devices. During a device authentication process, the device authentication module 314 may receive a device authentication credential (e.g., a device identifier, a secret code, a key, a digital certificate, and/or so forth) from a body-worn device. The device authentication module 314 may validate the device authentication credential against a list of authorized device authentication credentials stored in the memory 312 to determine if the body-worn device is authorized. Accordingly, the device authentication module 314 may determine that the device authentication credential of a body-worn device is valid when the device authentication credential matches an authorized device authentication credential stored in the data store 326. The list of device authentication credentials may be updated or modified by the server 114 of the NOC 112. Alternatively, or concurrently, the device authentication module 314 may provide a hub authentication credential to a body-worn device for the body-worn device to perform mutual authentication. In some embodiments, the authentication module 218 may also be configured to perform a secret key exchange with a hub or a server so that a corresponding secret key can be used to encrypt or decrypt the secured communication exchanged.

In instances in which the mobile hub 300 is a body-worn hub, the communication switch module 316 may switch the body-worn hub 104 between using the short-range wireless transceiver and a corresponding electrically conductive coupling port to exchange communications with a body-worn device. In some embodiments, the communication switch module 316 may automatically terminate a short-range wireless communication link that is established with the body-worn device when a wired connection is established with the body-worn device via a particular coupling port of the set of electrically conductive coupling ports 206. For example, the communication switch module 316 may detect that the body-worn device is connected to a particular coupling port based on change in one or more electrical properties (e.g., voltage, resistance, and/or current) at the particular coupling port. As a result, the communication switch module 316 may send a termination command via the particular coupling port to command the body-worn device to power off its short-range transceiver.

In other embodiments, the communication switch module 316 may further use a wired communication protocol (e.g., Universal Serial Bus (USB) protocol, TCP/IP, or some other wired communication protocol) to establish a wired communication link with the body-worn hub 104 over the wired connection. In some instances, the communication switch module 316 may wait for the body-worn device to initiate the establishment of the wired communication link using the wired communication protocol. However, in other instances, the communication switch module 316 may initiate the establishment of the wired communication link with the body-worn device using the wired communication protocol. Once the wired communication link is established, the communication switch module 316 may send a termination command via the particular coupling port to command the body-worn device to power off its short-range transceiver. In some instances, when the communication switch module 316 has received short-range wireless communication termination confirmations from all body-worn devices connected to its coupling ports, the communication switch module 316 may power off its short-range transceiver as well to conserve battery power.

Conversely, when the communication switch module 316 detects that the wired connection between the body-worn hub 104 and at least one body-worn device is severed, the communication switch module 316 may power on the short-range wireless transceiver of the body-worn hub 104. For example, the one or more electrical properties at the electrically conductive coupling port 206 may indicate to the communication switch module 316 that the wired connection is severed. In another example, the communication switch module 316 may determine that a wired connection to a body-worn device is severed when there is a lack of a periodic keep alive or heartbeat signal received from the body-worn device via the wired connection for a predetermined period of time. The powering on of the short-range wireless transceiver may enable the body-worn hub 104 to reestablish a short-range wireless communication link with the body-worn device with the severed wired connection.

The routing module 318 may handle the routing of event data of events that are received from the body-worn devices, such as the body-worn devices 106(1)-106(N), to different recipient devices and services. In various embodiments, the routing module 318 may route event data from one or more body-worn devices to the event handler module 322, to another hub, and/or to the servers 114 of the NOC 112. The routing module 318 may handle the routing of event data of each event based on customizable configuration settings stored in a configuration file. For example, when the mobile hub 300 is a vehicle hub that receives event data from body-worn hubs, the configuration settings may specify that the event data is to be stored and/or processed at the mobile hub 300 for generating commands to body-worn devices. In another example in which the mobile hub 300 is a body-worn hub, the configuration settings may specify that the event data is to be processed at the mobile hub 300 only when the mobile hub 300 is unable to communicatively connect with any vehicle hub or the servers 114, in order to conserve the battery life of the mobile hub 300. In a further example, the configuration settings may specify that the event data is to be routed to another hub for storage and/or processing. In an additional example, the configuration settings may specify that the event data is to be routed to the servers 114 of the NOC 112 for storage and/or processing. In other examples, the configuration settings for the event data may specify a combination of one or more of such routings for the event data. In some embodiments, the routing module 318 may receive updates or modifications to the configuration file from the servers 114 of the NOC 112 for storage in the data store 326.

The device ID module 320 may use the short-range transceivers and the long-range transceivers of the mobile hub 300 to detect mobile device IDs of mobile devices that are within proximity of the mobile hub 300. The mobile device IDs that are detected by the device ID module 320 may include identifiers that are broadcasted by the mobile devices via radio signals as the mobile devices communicate or attempt to establish communication with other mobile devices. For example, the mobile device IDs that are detected by a hub may include Bluetooth device IDs of Bluetooth devices (e.g., Bluetooth MAC addresses), Wi-Fi device IDs of Wi-Fi devices (e.g., MAC addresses, SSIDs, etc.), IMSIs, IMEIs, or some other electronic identifiers (e.g., MAC addresses) of cellular devices, and/or so forth. In some embodiments, the device ID module 320 may cause the mobile hub 300 to act as a virtual base station in order to identify the mobile device IDs of nearby cellular devices.

The device ID module 320 may use various techniques to determine a geolocation of a mobile device with a detected mobile device ID. In some instances, the geolocation of the mobile device may be determined using signal triangulation based on the signal strength measurements obtained for the radio signal that broadcasted the detected mobile device ID. For example, the signal triangulation may provide an estimated position of the mobile device relative to the position of the mobile hub 300, as well as the distance between the two positions. The estimated position is then translated by the device ID module 320 into a geolocation for the mobile device using geographical map data. In additional instances, the geolocation of the mobile device may be determined using WPS, which is the use of the known geolocations of Wi-Fi hotspots and wireless access points that are near a Wi-Fi mobile device to approximate where the Wi-Fi mobile device is located. In other instances, the geolocation of the mobile device may be determined based on geolocation information provided by a mobile device in response to a geolocation request sent by the device ID module 320. In this way, the device ID module 320 may compile device detection information for each detection of a mobile device ID for transmission to another mobile hub, such as a body-worn hub or a vehicle hub, or the servers of a NOC. The device detection information associated with a detection of a mobile device ID may include the mobile device ID, an approximate geolocation of the mobile device with the mobile device ID, a date and time that the mobile device ID is detected, a signal strength measurement of the radio signal that broadcasted the mobile device ID, any additional device identification information associated with the mobile device ID, and/or so forth.

The event handler module 322 may use an event handler to process event data received from one or more body-worn devices to generate commands for at least one specific body-worn device to perform a particular action. In various embodiments, the event data may be notifications received from body-worn devices that are directly connected to the body-worn hub 104 and/or notifications received from body-worn devices connected to other hubs. For example, the event handler module 322 may generate a command for the body camera 106(1) to start recording when the event handler module 322 receives a notification that the gun 110 is unholstered. In another example, the event handler module 322 may generate a command for the body camera 106(1) to start recording when event handler module 322 receives a notification that the gun 110 is unholstered and the biometric monitor 106(2) detects that the heart rate of the law enforcement officer 102 is above a predetermined rate threshold.

In some embodiments, the event handler module 322 may generate at least one particular command in response to one or more specific events based on a customizable handler configuration file. The customizable handler configuration file may specify one or more actions to be taken and the body-worn devices that are to take the actions for different sets of one or more event data. In other embodiments, the event handler module 322 may use a machine-learning algorithm to determine one or more actions to be taken and the body-worn devices that are to take the action based on different sets of one or more event data. However, in some additional embodiments, the event handler module 322 may be configured to send event data that the mobile hub 300 obtains from body-worn devices and/or other hubs to another specifically designated data-processing hub for processing, or jointly process the event data of events as obtained by multiple source body-worn devices with the event handler module of another hub. The event handler module 322 may receive updates or modifications to the handler configuration profile from the servers 114 of the NOC 112 for storage in the data store 326.

In additional embodiments, the event handler module 322 may receive a list of suspicious mobile device IDs from the application 132. Thus, when the device ID module 320 newly detects a mobile device ID that matches a suspicious mobile device ID on the list, event handler module 322 may determine whether the detected mobile device ID is within a predetermined distance of the mobile hub 300. For example, the event handler module 322 may use the distances estimated by the device ID module 320 to perform such determinations. If the mobile device ID is within the predetermined distance, the event handler module 322 may generate an alert that indicates the presence of such a mobile device for display via a user device (e.g., a smartphone) communicatively connected to the mobile hub. In some instances, the event handler module 322 may also generate a command for one or more user devices, such as a body-worn camera or a vehicle camera, to record sensor data (e.g., audiovisual recording, audio recording, video recording, etc.) until the mobile hub 300 is no longer within the predetermined distance of the mobile device with the suspicious mobile device ID. For example, the mobile hub may generate a first command for a body-worn camera or a vehicle-mounted camera to start recording video footage and then generate a second command for the body-worn camera or the vehicle-mounted camera to stop recording video footage.

The data transfer module 324 may receive event data or device detection information that is captured by a communicatively connected body-worn device. The data transfer module 324 may be configured to automatically transfer such data, as well as device detection information captured by the mobile hub 300, to a data store of the NOC as well as back up the data. The data store may be provided by memory in the servers 114 of the NOC 112. The data transfer module 324 may store the data in the data store 326 of the mobile hub 300. Further, in some instances, the data transfer module 324 may backup the data to a memory of an additional hub, such as another body-worn hub or a vehicle hub. Subsequently, the data transfer module 324 may transfer a copy of the data for a predetermined period of time to a data store of the NOC 112. The data for the predetermined period of time may be a portion or an entirety of the data that the mobile hub 300 received from a device up to that point in time. The data store may be a secure file storage that is maintained by the NOC 112. Following receiving a confirmation from the servers 114 indicating that the data for a predetermined period of time is successfully stored in the data store of the NOC 112, the data transfer module 324 may send a command to the additional hub to delete a backup of the event data for the predetermined period of time from the memory of the additional hub. Alternatively, or concurrently, the data transfer module 324 may send a command to the body-worn device to delete the data for the predetermined period of time from a memory of the device and/or delete the backup data from the data store 326.

Example NOC Application Components

Figure 4:
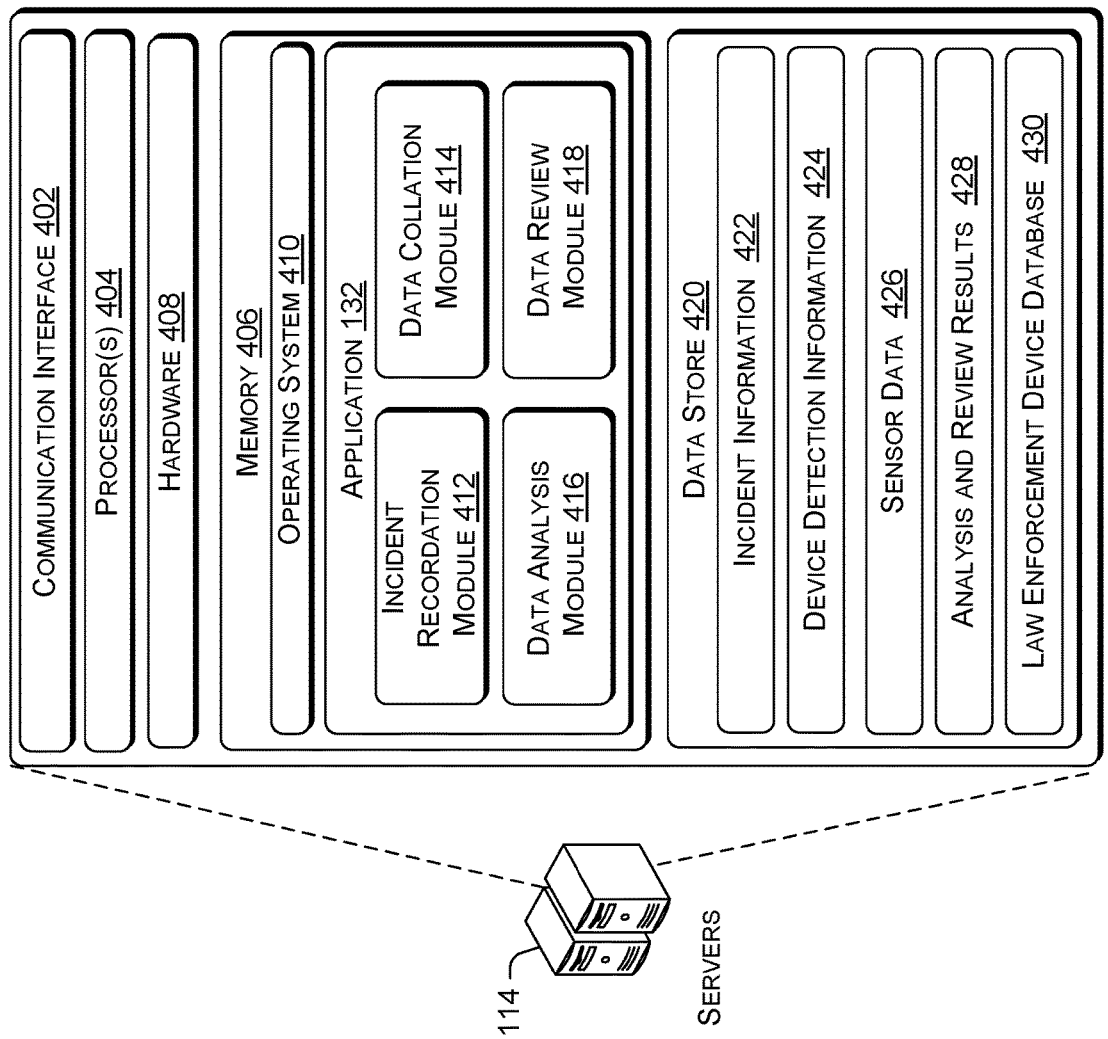
FIG. 4 is a block diagram showing various components of a NOC application that participates in mobile device ID tracking for automatic incident data association and correlation.

FIG. 4 is a block diagram showing various components of a NOC application that participates in mobile device ID tracking for automatic incident data association and correlation. The computing nodes 106 may provide a communication interface 402, one or more processors 404, memory 406, and hardware 408. The communication interface 402 may include wireless and/or wired communication components that enable the devices to transmit data to and receive data from other networked devices. The hardware 408 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 404 and the memory 406 of the computing nodes 106 may implement an operating system 410. In turn, the operating system 410 may provide an execution environment for the application 132. The operating system 410 may include components that enable the computing nodes 106 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The application 132 may include an incident recordation module 412, a data collation module 414, a data analysis module 416, and a data review module 418. The modules may include routines, program instructions, objects, and/or data structures that perform particular tasks or implement particular abstract data types. The memory 406 may also include a data store 420 that is used by the application 132. The data store 420 may store incident information 422, device detection information 424 received from various mobile hubs, sensor data 426 received from various mobile hubs, as well as analysis and review results 428 generated by the modules of the application 132.

The incident recordation module 412 may record an incident as having occurred at a particular geolocation at a particular date and time. In some instances, an incident may be recorded by the incident recordation module 412 based on incident data inputted by an administrator via an interface portal. The incident data may include a description of the incident, an incident classification of the incident, a date and time of occurrence for the incident, an incident identifier, and/or so forth. For example, the incident classification of the incident may be selected from a menu of possible incident classification categories via an interface portal provided by the incident recordation module 412. In other instances, an incident may be automatically tracked and classified by the incident recordation module 412 based on information that is extracted by the incident recordation module 412 from police reports filed by law enforcement officers, reports filed by other emergency responders, emergency responder dispatch logs, and/or other electronic sources that are accessible or stored by the NOC 112. For example, the incident recordation module 412 may use a data classification algorithm, such as a machine-learning algorithm, to automatically perform the tracking and classification.

The data collation module 414 may identify any mobile device IDs corresponding to the mobile hubs of law enforcement officers that were present in a selected geographical zone that includes the geolocation where an incident occurred during a selected time frame that includes the particular date and time. The incident may be an incident that is selected for further analysis by a user via an interface portal provided by the data collation module 414. The interface portal may be a network portal that is accessible via a web browser or a user interface of the application 132. The data collation module 414 may use a law enforcement device database 430 maintained by the NOC 112 in the data store 420. The law enforcement device database 430 may include mobile device ID information for all mobile devices associated with law enforcement officers. In various embodiments, the geographical zone and the time frame may be inputted via the interface portal provided by the data collation module 414. Once one or more such mobile hubs are identified, the data collation module 414 may associate the data recorded by the user devices communicatively connected to the mobile hubs that were present in the selected geographical zone during the particular date and time with the incident. The data may include data that is stored in the data store 420 or data that may be uploaded to the data store 420 at a future date that is within a predefined date range. In some instances, the application 132 may include a reviewing function that enables a law enforcement officer to review the various data for any information that may be relevant to the incident. For example, the review function may be used to playback, fast forward, rewind, slow playback, fast playback, pause various audiovisual recordings, video recordings, and/or audio recordings associated with the incident.

The data analysis module 416 may identify any mobile device IDs of non-law enforcement officer devices that are present within a selected geographical zone that includes the particular geolocation of an incident during a selected time frame that includes the particular date and time, as well as present within a defined proximity to one or more geolocations of one or more similar incidents within identical or similar time frames. The incident may be an incident that is selected for further analysis by a user via an interface portal provided by the data analysis module 416. The interface portal may be a network portal that is accessible via a web browser or a user interface of the application 132. The data analysis module 416 may eliminate mobile device IDs of known law enforcement mobile devices (e.g., mobile hubs, vehicle-mounted devices, body-worn devices, etc.) by cross-checking the detected mobile device IDs within the selected geographical zone during the selected time frame against device information in the law enforcement device database 430. In various embodiments, the geographical zone, the time frame, and the proximity may be inputted via the interface portal provided by the data collation module 414. Accordingly, such identified mobile device IDs may be designated by the data analysis module 416 as suspicious mobile device IDs of mobile devices that may belong to potential suspects or persons of interest associated with the incidents. Thus, the data analysis module 416 may send such suspicious mobile device IDs to one or more mobile hubs.

The data review module 418 may provide a map function that is used to present the locations of the mobile devices with suspicious mobile device IDs on a geographical map to depict the geolocations and/or movements of such devices during the occurrence of one or more incidents. In further embodiments, the data review module 418 may provide functions that enable the detection of objects, such as people, vehicles, animals, etc. that are commonly present in multiple files of sensor data that are associated with an incident or multiple incidents. For example, an object may be identified as being present in multiple media files (e.g., audiovisual recordings, video recordings, etc.) using one or more object recognition algorithms, such as a facial recognition algorithm, a pattern recognition algorithm, a template matching algorithm, and/or so forth. In some instances, the object recognition algorithms may implement the use of machine-learning models. Further, the identified object may be tracked across multiple video frames of video data using a video tracking algorithm. For example, the video tracking algorithm may include a kernel-based tracking function that performs an iterative localization procedure based on the maximization of a similarity measure for the video frames. Alternatively, or concurrently, the video tracking algorithm may include a contour tracking function that detects object contour boundaries and iteratively evolves an initial contour from a previous video frame to its new position in a current video frame. In some embodiments, the data review module 418 may automatically alert a user to the presence of an object in multiple media files by highlighting an object (e.g., superimposing an indicator on the object) as a media file is playback or extracting an image of the object to be displayed separately. In additional embodiments, the data review module 418 may use an audio recognition algorithm to identify a sound or noise (e.g., car engine noise, weapon discharge noise, etc.) that is present in multiple media files. Accordingly, the data review module 418 may isolate such sound or noise by generating sound files for playback.

Example Processes

Figure 5:
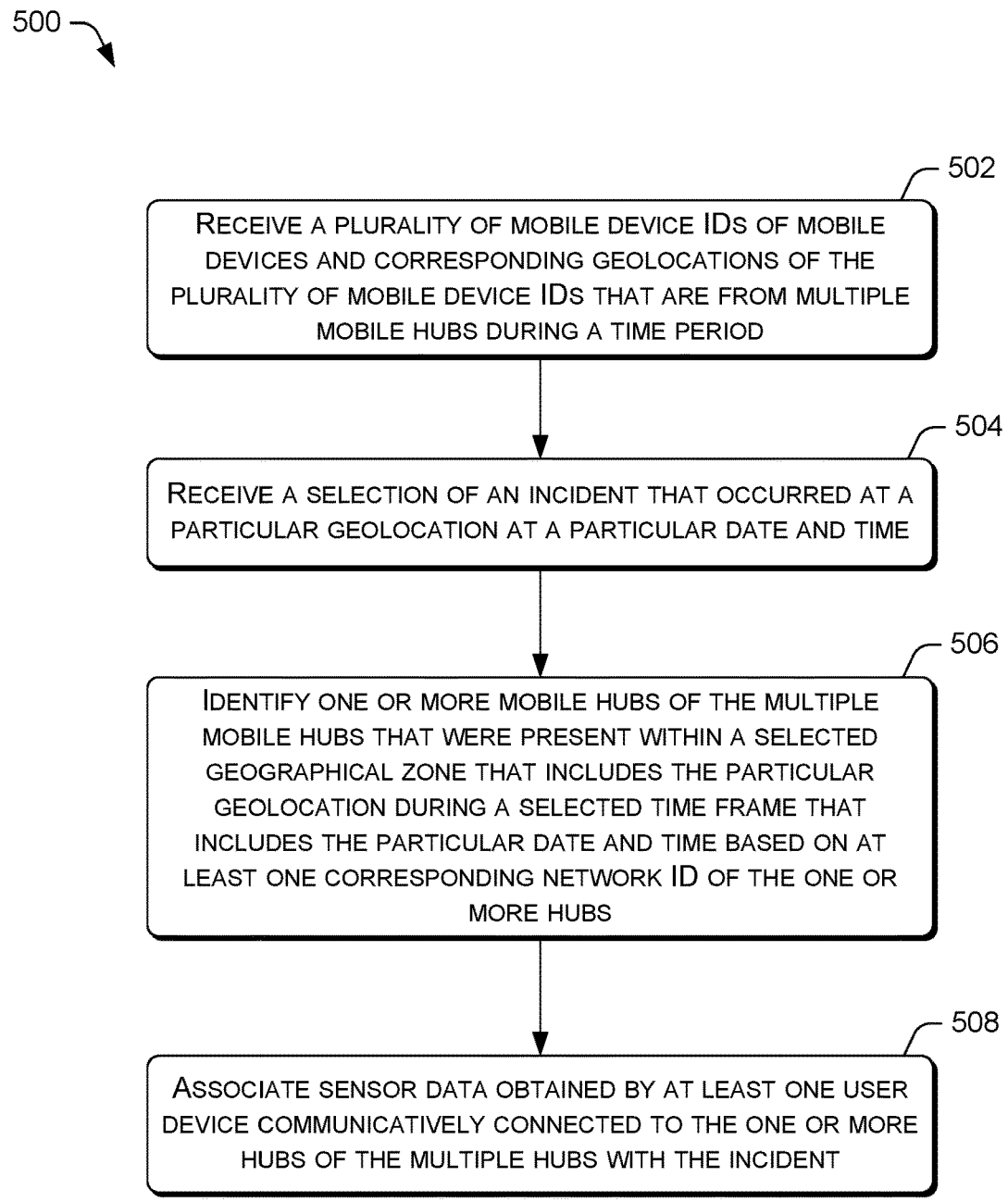
FIG. 5 is a flow diagram of an example process for associating sensor data obtained by user devices that are communicatively connected to mobile hubs with an incident.
Figure 6:
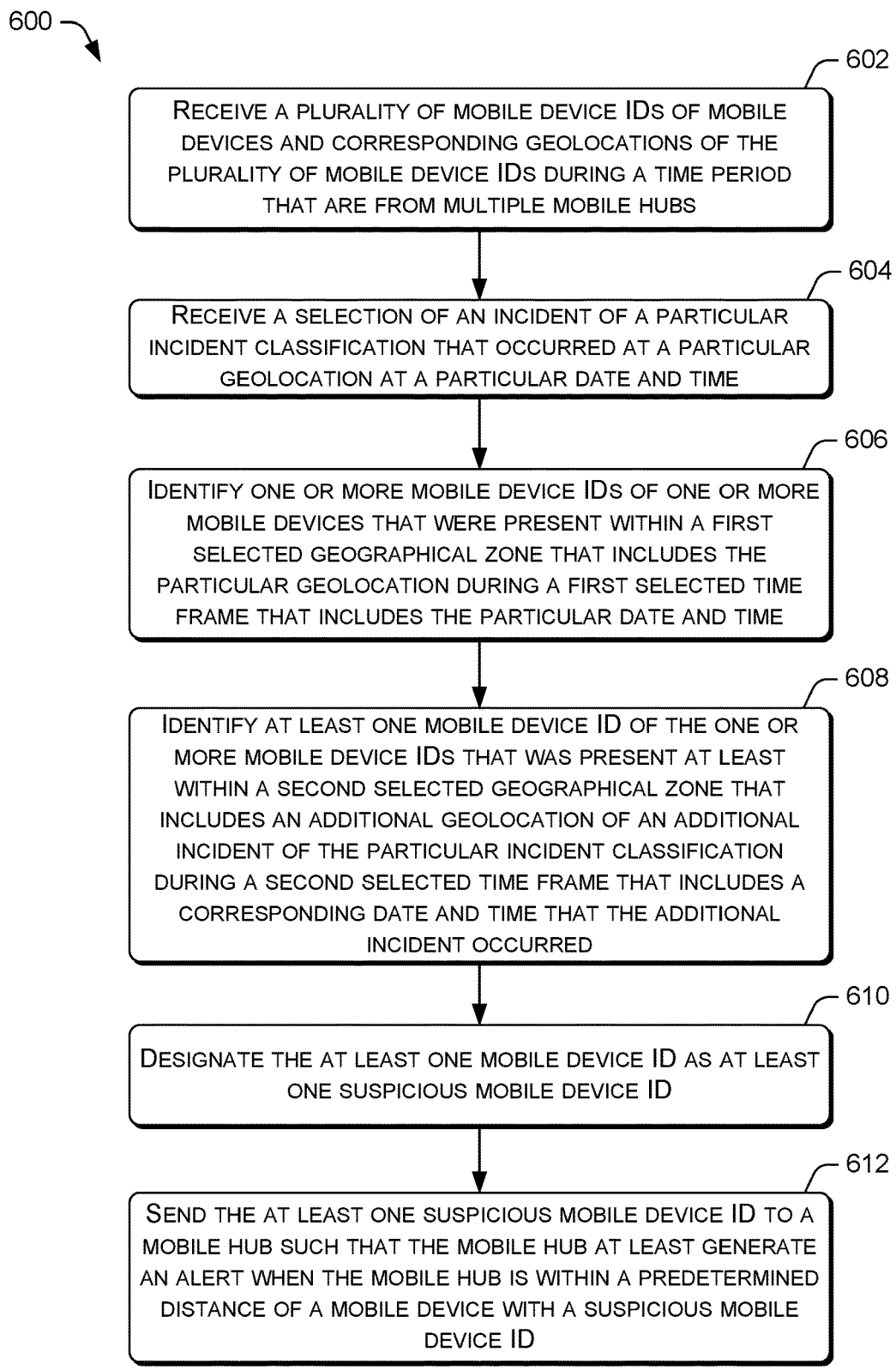
FIG. 6 is a flow diagram of an example process for identifying a suspicious mobile device ID via mobile device ID tracking for automatic incident data association and correlation.
Figure 7:
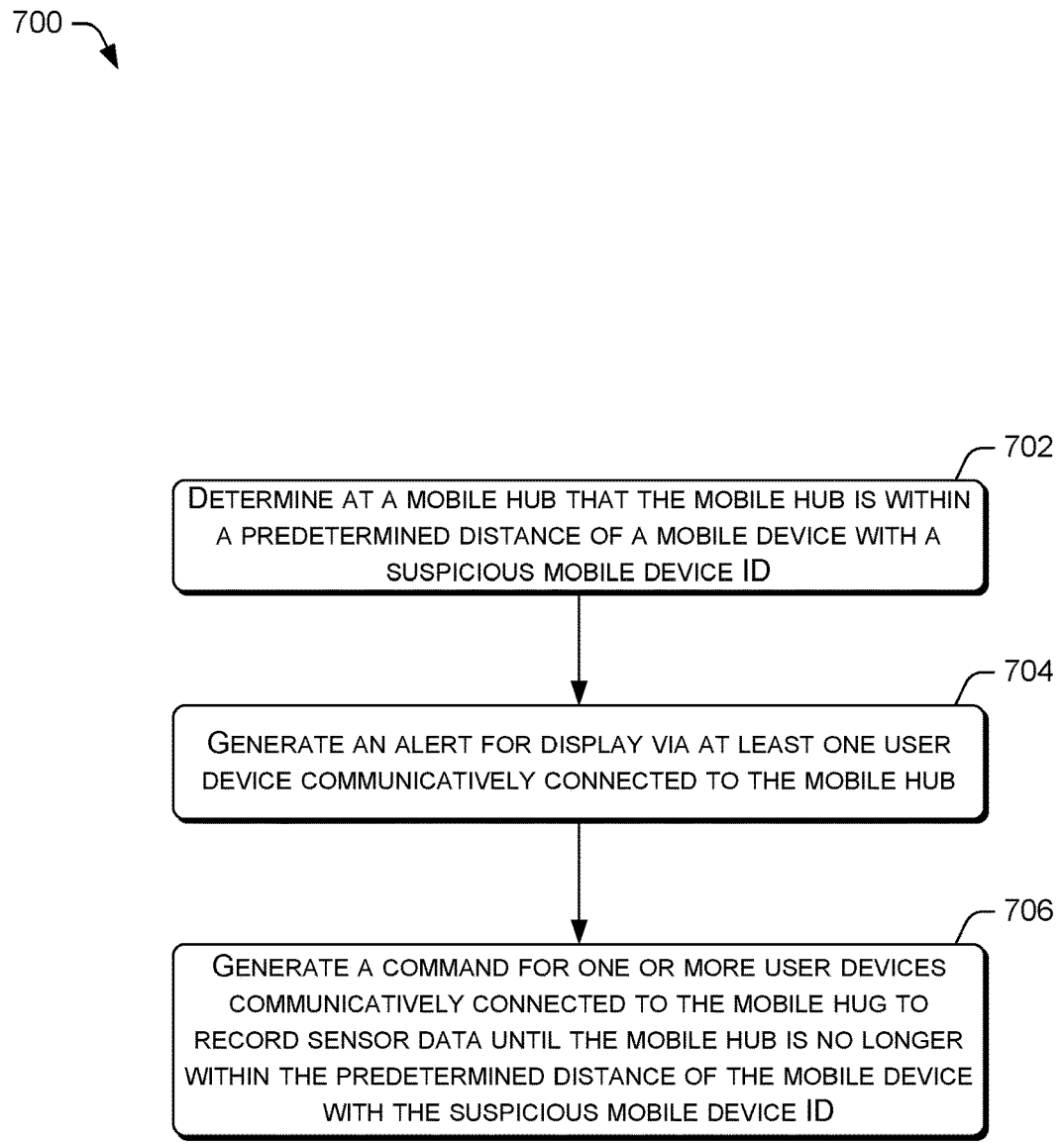
FIG. 7 is a flow diagram of an example process that a mobile hub uses to perform actions following mobile device ID tracking for automatic incident data association and correlation.

FIGS. 5-7 present illustrative processes 500-700 for implementing mobile device identifier ID tracking for automatic incident data association and correlation. Each of the processes 500-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-700 are described with reference to the environment 100 of FIG. 1.

FIG. 5 is a flow diagram of an example process 500 for association sensor data obtained by user devices that are communicatively connected to mobile hubs with an incident. At block 502, the application 132 may receive a plurality of mobile device IDs for mobile devices and corresponding geolocations of the plurality of mobile device IDs from multiple mobile hubs during a time period. In various embodiments, mobile device IDs may include Bluetooth device IDs of Bluetooth devices (e.g., Bluetooth MAC addresses), Wi-Fi device IDs of Wi-Fi devices (e.g., MAC addresses, SSIDs, etc.), IMSIs, IMEIs, or some other electronic identifiers (e.g., MAC addresses) of cellular devices, and/or so forth. The mobile device IDs may be captured by the mobile hubs or user devices communicatively connected to the mobile hubs.

At block 504, the application 132 may receive a selection of an incident that occurred at a particular geolocation at a particular date and time. At block 506, the application 132 may identify one or more mobile hubs of the multiple hubs that were present within a selected geographical zone that includes the particular geolocation during a selected time frame that includes the particular date and time based on at least one corresponding mobile device ID of the one or more mobile hubs. In various embodiments, the selected geographical zone may be a zone that is custom selected for the incident or a zone that is defined as being of a predetermined radius around the particular geolocation of the incident. The selected time frame may be a time frame that is custom selected for the incident or a time frame that is predefined as including a first amount of time before an occurrence of the incident and/or a second amount of time following the occurrence of the incident.

At block 508, the NOC application may associate sensor data obtained by at least one user device communicatively connected to the one or more mobile hubs of the multiple mobile hubs with the incident. For example, the sensor data may include audiovisual recordings, audio communication, background noise, and/or so forth.

FIG. 6 is a flow diagram of an example process 600 for identifying a suspicious mobile device ID via mobile device ID tracking for automatic incident data association and correlation. At block 602, the application 132 may receive a plurality of mobile device IDs for mobile devices and corresponding geolocations of the plurality of mobile device IDs from multiple mobile hubs during a time period. In various embodiments, mobile device IDs may include Bluetooth device IDs of Bluetooth devices (e.g., Bluetooth MAC addresses), Wi-Fi device IDs of Wi-Fi devices (e.g., MAC addresses, SSIDs, etc.), IMSIs, IMEIs, or some other electronic identifiers (e.g., MAC addresses) of cellular devices, and/or so forth. The mobile device IDs may be captured by the mobile hubs or user devices communicatively connected to the mobile hubs.

At block 604, the application 132 may receive a selection of an incident of a particular incident classification that occurred at a particular geolocation at a particular date and time. At block 606, the application 132 may identify one or more mobile device IDs of one or more mobile devices that were present within a first selected geographical zone that includes the particular geolocation during a first selected time frame that includes the particular date and time. The first selected geographical zone may be a zone that is custom selected for the incident or a zone that is defined as being of a predetermined radius around the particular geolocation of the incident. For example, the custom selection may be a geofenced zone of any size and/or shape that includes the particular geolocation of the incident. Likewise, the first selected time frame may be time frame that is custom selected for the incident or a time frame that is predefined as including a first amount of time before an occurrence of the incident and/or a second amount of time following the occurrence of the incident.

At block 608, the application 132 may identify at least one mobile device ID of the one or more mobile device IDs that were present at least present within a second selected geographical zone that includes an additional location of an additional incident of the particular incident classification during a second selected time frame that includes a corresponding date and time at which the additional incident occurred. The second selected geographical zone may be a zone that is custom selected for the additional incident or a zone that is defined as being of a predetermined radius around a particular geolocation of the additional incident. For example, the custom selection may be a geofenced zone of any size and/or shape that includes the particular geolocation of the incident. Likewise, the second selected time frame may be a time frame that is custom selected for the additional incident or a time frame that is predefined as including a first amount of time before an occurrence of the incident and/or a second amount of time following the occurrence of the additional incident.

At block 610, the application 132 may designate at least one mobile device ID as at least one suspicious mobile device ID. At block 612, the application 132 may send the at least one suspicious mobile device ID to a mobile hub such that the mobile hub at least generates an alert when the mobile hub is within a predetermined distance of a mobile device with a suspicious mobile device ID.

FIG. 7 is a flow diagram of an example process 700 that a mobile hub uses to perform actions following mobile device ID tracking for automatic incident data association and correlation. At block 702, a mobile hub may determine that the mobile hub is within a predetermined distance of a mobile device with a suspicious mobile device ID. At block 704, the mobile hub may generate an alert for display via at least one user device communicatively connected to the mobile hub. For example, the user device may be a body-worn device in the form of a smartphone or a vehicle-mounted device in the form of a laptop computer.

At block 706, the mobile hub may generate a command for one or more user devices communicatively connected to the mobile hub to record sensor data until the mobile hub is no longer within the predetermined distance of the mobile device with the suspicious mobile device ID. For example, the mobile hub may generate a first command for a body-worn camera or a vehicle-mounted camera to start recording video footage and then generate a second command for the body-worn camera or the vehicle-mounted camera to stop recording video footage.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a hub storing computer-executable instructions that upon execution cause one or more processors to perform acts comprising:

receiving a plurality of mobile device identifiers (IDs) of mobile devices and corresponding geolocations of the plurality of mobile device IDs from multiple mobile hubs during a time period;

receiving a selection of an incident that occurred at a particular geolocation at a particular date and time within the time period;

identifying one or more mobile hubs of the multiple mobile hubs that were present within a selected geographical zone that includes the particular geolocation during a selected time frame that includes the particular date and time based on hub itinerary information of the one or more mobile hubs; and associating sensor data obtained by at least one user device communicatively connected to the one or more mobile hubs of the multiple hubs that were present in the selected geographical zone during the particular date and time with the incident.

2. The one or more non-transitory computer-readable media of claim 1, wherein the incident is associated with a particular incident classification, and wherein the acts further comprise:

identifying one or more mobile device IDs of one or more mobile devices that were present within a selected first additional selected geographical zone that includes the particular geolocation during a selected first additional time frame that includes the particular date and time;

identifying at least one mobile device ID of the one or more mobile device IDs that were present at least within a selected second additional geographical zone that includes an additional location of an additional incident of the particular incident classification during a selected second additional time frame that includes a corresponding date and time at which the additional incident occurred;

designating the at least one mobile device ID as at least one suspicious mobile device ID; and sending the at least one suspicious mobile device ID to at least one mobile hub of the multiple mobile hubs.

3. The one or more non-transitory computer-readable media of claim 2, wherein the acts further comprise present a location of a mobile device with a suspicious mobile device ID of the at least one suspicious mobile device ID on a map.

4. The one or more non-transitory computer-readable media of claim 2, wherein the sending includes sending the at least one suspicious mobile device ID to a mobile hub such that the mobile hub of the one or more mobile hubs generates an alert when the mobile hub is within a predetermined distance of a mobile device with a suspicious mobile device ID of the at least one suspicious mobile device ID.

5. The one or more non-transitory computer-readable media of claim 2, wherein the sending includes sending the at least one suspicious mobile device ID to a mobile hub of the one or more mobile hubs such that the mobile hub generates a command for one or more corresponding connected user devices communicatively connected to the mobile hub to record additional sensor data when the mobile hub is within a predetermined distance of a mobile device with a suspicious mobile device ID of the at least one suspicious mobile device ID.

6. The one or more non-transitory computer-readable media of claim 5, wherein the command directs the one or more corresponding connected user devices to record the additional sensor data until the mobile hub is no longer within the predetermined distance of the mobile device with the suspicious mobile device ID.

7. The one or more non-transitory computer-readable media of claim 2, wherein the one or more mobile devices include one or more non-law enforcement devices.

8. The one or more non-transitory computer-readable media of claim 1, where the mobile hub is a body-worn hub worn by a law enforcement officer or a vehicle-mounted hub in a law enforcement vehicle.

9. The one or more non-transitory computer-readable media of claim 1, wherein the mobile device IDs include a Bluetooth device ID, a media access control (MAC) address, a Service Set Identifier (SSID), an International Mobile Subscriber Identity (IMSI), or an International Mobile Equipment Identity (IMEI).

10. The one or more non-transitory computer-readable media of claim 1, wherein the at least one user device includes a body-worn camera or a vehicle-mounted camera.

11. The one or more non-transitory computer-readable media of claim 1, wherein the sensor data includes an audiovisual recording, a video recording, or an audio recording.

12. A system, comprising:
one or more processors; and
memory including a plurality of computer-executable components that are executable by the one or more processors to perform a plurality of actions, the plurality of actions comprising:
receiving a plurality of mobile device identifiers (IDs) of mobile devices and corresponding geolocations of the plurality of mobile device IDs from multiple mobile hubs during a time period;
receiving a selection of an incident of a particular incident classification that occurred at a particular geolocation at a particular date and time within the time period;
identifying one or more mobile device IDs of the plurality of mobile device IDs that were present within a selected first geographical zone that includes the particular geolocation during a selected first time frame that includes the particular date and time;
identifying at least one mobile device ID of the one or more mobile device IDs that were present at least within a selected second additional geographical zone that includes an additional location of an additional incident of the particular incident classification during a selected second additional time frame that includes a corresponding date and time at which the additional incident occurred;
designating the at least one mobile device ID as at least one suspicious mobile device ID; and
sending the at least one suspicious mobile device ID to at least one of the multiple mobile hubs.

13. The system of claim 12, wherein the sending includes sending the at least one suspicious mobile device ID to a mobile hub of the at least one mobile hub such that the mobile hub generates an alert when the mobile hub is within a predetermined distance of a mobile device with a suspicious mobile device ID of the at least one suspicious mobile device ID.

14. The system of claim 12, wherein the sending include sending the at least one suspicious mobile device ID to a mobile hub of the at least one mobile hub of the multiple mobile hubs such that the mobile hub generates a command for one or more user devices communicatively connected to the mobile hub to record additional sensor data when the mobile hub is within a predetermined distance of a mobile device with a suspicious mobile device ID of the at least one suspicious mobile device ID.

15. The system of claim 12, wherein the plurality of actions further comprise:
identifying one or more mobile hubs of the multiple mobile hubs that were present within a selected additional geographical zone that includes the particular geolocation during a selected additional time frame that includes the particular date and time based on hub itinerary information of the one or more mobile hubs indicating the one or more mobile hubs as being present in the selected additional geographical area during the selected additional time frame; and
associating sensor data obtained by at least one user device communicatively connected to the one or more mobile hubs of the multiple hubs that were present in the selected additional geographical zone during the particular date and time with the incident.

16. The system of claim 15, wherein the selected additional geographical zone is identical to the selected first geographical zone, and wherein the selected additional time frame is identical to the selected first time frame.

17. The system of claim 12, wherein the plurality of mobile device IDs are detected by the mobile hub of the multiple mobile hubs or a user device that is communicatively connected to the mobile hub.

18. The system of claim 12, wherein the mobile device IDs include a Bluetooth device ID, a media access control (MAC) address, a Service Set Identifier (SSID), an International Mobile Subscriber Identity (IMSI), or an International Mobile Equipment Identity (IMEI).

19. A computer-implemented method, comprising:
receiving, at one or more servers, a plurality of mobile device identifiers (IDs) of mobile devices and corresponding geolocations of the plurality of mobile device IDs from multiple mobile hubs during a time period;
receiving, at the one or more servers, a selection of an incident that occurred at a particular geolocation at a particular date and time within the time period;
identifying, at the one or more servers, one or more mobile hubs of the multiple mobile hubs that were present within a selected geographical zone that includes the particular geolocation during a selected time frame that includes the particular date and time, the one or more mobile hubs being identified as being present based on hub itinerary information of the one or more mobile hubs as uploaded by the one or more mobile hubs to the one or more servers indicating that the one or more mobile hubs are present in the selected geographical area during the selected time frame; and
associating, at the one or more servers, sensor data obtained by at least one user device communicatively connected to the one or more mobile hubs of the multiple hubs that were present in the selected geographical zone during the particular date and time with the incident.

20. The computer-implemented method of claim 19, wherein the incident is associated with a particular incident classification, further comprising:
identifying, at the one or more servers, one or more mobile device IDs of one or more mobile devices that were present within a selected first additional selected geographical zone that includes the particular geolocation during a selected first additional time frame that includes the particular date and time;

identifying, at the one or more servers, at least one mobile device ID of the one or more mobile device IDs that were present at least within a selected second additional geographical zone that includes an additional location of an additional incident of the particular incident classification during a selected second additional time frame that includes a corresponding date and time at which the additional incident occurred;

designating, at the one or more servers, the at least one mobile device ID as at least one suspicious mobile device ID; and sending, from the one or more servers, the at least one suspicious mobile device ID to at least one mobile hub of the multiple mobile hubs.

\* \* \* \* \*